(12) United States Patent
Horman

(10) Patent No.: US 6,704,778 B1
(45) Date of Patent: Mar. 9, 2004

(54) METHOD AND APPARATUS FOR MAINTAINING CONSISTENCY AMONG LARGE NUMBERS OF SIMILARLY CONFIGURED INFORMATION HANDLING SERVERS

(75) Inventor: Randall William Horman, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/651,495

(22) Filed: Aug. 30, 2000

(30) Foreign Application Priority Data

Sep. 1, 1999 (CA) .............................................. 2281370

(51) Int. Cl.⁷ .............................................. G06F 13/00
(52) U.S. Cl. ........................ 709/220; 709/223; 709/248
(58) Field of Search ................................. 709/200, 201, 709/203, 217, 218, 219, 220, 221, 227, 248, 223

(56) References Cited

U.S. PATENT DOCUMENTS

| | | | | |
|---|---|---|---|---|
| 5,832,225 A | * | 11/1998 | Hacherl et al. | 707/200 |
| 5,857,102 A | * | 1/1999 | McChesney et al. | 395/651 |
| 6,128,644 A | * | 10/2000 | Nozaki | 709/203 |
| 6,167,408 A | * | 12/2000 | Cannon et al. | 707/203 |
| 6,256,747 B1 | * | 7/2001 | Inohara et al. | 714/4 |
| 6,330,600 B1 | * | 12/2001 | Matchefts et al. | 709/223 |
| 6,334,178 B1 | * | 12/2001 | Cannon et al. | 712/28 |
| 6,538,668 B1 | * | 3/2003 | Ruberg et al. | 345/747 |
| 6,564,216 B2 | * | 5/2003 | Waters | 707/10 |

* cited by examiner

Primary Examiner—Moustafa M. Meky
(74) Attorney, Agent, or Firm—Wayne L. Ellenbogen; Anne V. Dougherty

(57) ABSTRACT

The invention provides a method and apparatus for use in an information handling network having an administrative control server and a number of administered servers that are members of the network and are managed by the control server, of providing maintenance of the administered servers for maintaining conformity of configuration of each of the administered servers to a predetermined configuration for all administered servers of the network while permitting evolution of the predetermined configuration from an initial network member configuration to a current network member configuration to which each of the administered servers is to conform, the method including: evolving, as required, the configuration of each server from its current configuration state to the current network member configuration in the following steps: initiating communication, by an administered server, of identification information to the control server identifying the administered server; verifying by the control server whether the administered server is a member of the network managed by the control server, and if it is so managed, then; determining by the control server whether the administered server configuration requires evolution to the current network member configuration; and, if evolution is required by the administered server, then the control server determines what commands are required to evolve the administered server configuration to the current network member configuration; the control server communicates the required commands to the administered server; the administered server executes the required commands to evolve its configuration to the current network member configuration; and the administered server communicates results of the execution of the commands to the control server identifying whether its configuration was successfully evolved to the current network member configuration.

17 Claims, 6 Drawing Sheets

FIG.2
ADMINISTERED SERVER 14
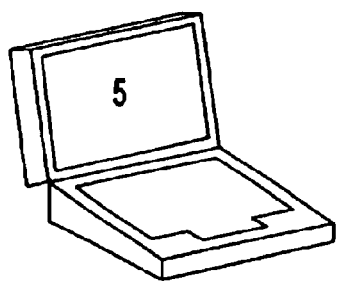
ADMINISTRATIVE CONTROL SERVER 11
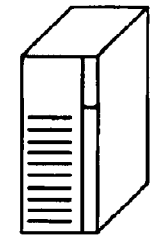
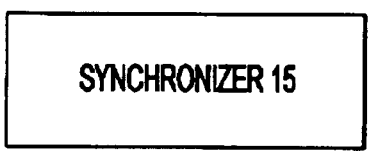
SYNCHRONIZER 15
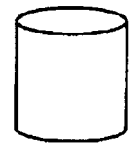
ADMINISTRATIVE CONTROL DATABASE 12

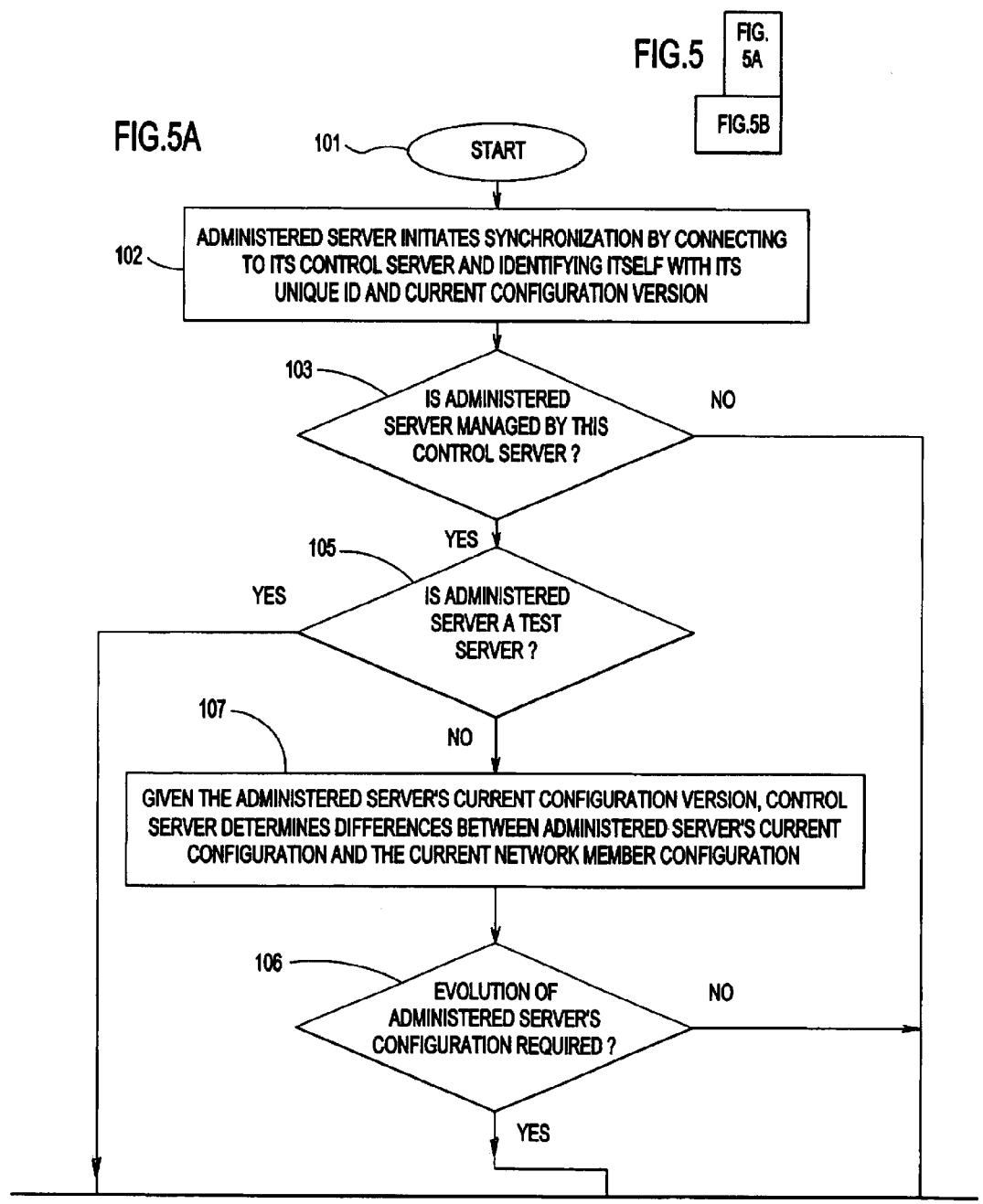

METHOD AND APPARATUS FOR MAINTAINING CONSISTENCY AMONG LARGE NUMBERS OF SIMILARLY CONFIGURED INFORMATION HANDLING SERVERS

FIELD OF THE INVENTION

The present invention is directed to the administration of a computer network, particularly the administration of a network of servers, and provides a dynamic method of effecting change to the configuration of the servers.

BACKGROUND OF THE INVENTION

Administering a large number of servers, such as database servers, in a distributed database system is a complex task comprising several dimensions.

One dimension of administrative complexity is the sheer magnitude of administered servers. That is, complexity is inherent in keeping track of, and dealing with, a great many things. When each such managed entity possesses unique characteristics or attributes, another layer of complexity, the second dimension, is introduced. Such identifying characteristics can be considered static in nature. That is, they define the managed entity, e.g. a network address, and tend not to change over time. However, there are states of operation or configuration that are dynamic, e.g., creating, modifying, or deleting database objects managed by a server. That is, the act of administration will move a server from one state of configuration to the next. Indeed, non-administrative acts can alter the configuration of a server, sometimes rendering it's state. unknown or unusable. This aspect of administrative complexity is the third dimension.

The administration of large numbers of servers, the configurations of which begin, and must remain "similar", is a very difficult and complex task. Each administered server is assumed to operate independently from all other similarly-configured, administered servers. (The set of all similarly-configured, administered servers which will be managed collectively will be referred to as a "group".) That is, each administered server will be engaged in its responsibilities independently of the other group members, and thus require a maintenance window that need not coincide with any other member's maintenance window. (A maintenance window is the period of time during which maintenance activities may be performed against an administered server such that mainline, core business responsibilities are not impacted.) Consequently, at any given time each administered server can be in a state of configuration that is similar to only a few other group members. In fact, it may not be similar to any others. Given the large numbers of administered servers in the group that must be managed, this implies there are a great many different states of configuration outstanding at any given time. These are very difficult circumstances under which administration must take place.

All administered servers are grouped together because of their similarity in configuration. That is, their configurations are identical for those aspects of configuration which are subject to group administration. For example, group administrative activities may be restricted to the maintenance of a DBMS server configuration, and not the Operating System upon which the DBMS executes. In this case, all servers which run a DBMS of a particular configuration are grouped together for the purposes of maintaining that configuration. In other words, there is a single group configuration that each server within the group must use. However, that single configuration will necessarily change over time as requirements and demands change. Unfortunately, if you combine the changing group configuration with the difficulties of managing the large numbers of administered servers in the group as indicate above, you can have many administered servers which are in various states of consistency within the group configuration. Essentially, you have many independent servers attempting to become consistent with a moving target according to an independent schedule.

It is, therefore, an objective of the present invention to provide a system and method for dynamic and flexible administration of a plurality of servers.

SUMMARY OF THE INVENTION

The present invention provides for the simplification of server administration in this complex environment by controlling each dimension in a systematic way. First, the complexity embodied by the first two dimensions can be characterized as the difficulty in managing large numbers of different things. In a sense, this is the static aspect of administration—accounting for, and awareness of, all the many entities under management. Second, which is the dynamic aspect of management, is concerned with affecting change to the configuration or state of each of the many managed entities. Although the managed entities are not identical, it is assumed there exist collections of different entities which share "similar" configurations. In this way, grouping can be used to reduce the many to a few. By managing a group of similarly configured servers, instead of managing each individual server, complexity is reduced. The invention provides a system and method for effecting a change of state to a group of a large number of similarly-configured, but not necessarily identical, managed entities in a controlled, simplified way.

In order to reduce the administrative complexity inherent in managing large numbers of similarly-configured servers, as described above, a model, controls, and mechanism are required for the specification, deployment, and maintenance of the single, group-level configuration such that:

1. There exists a single, well-defined definition of the initial group state, and all subsequent changes to the initial state given as incremental modifications. That is, the group state, to which all administered servers must be consistent, must have a well-defined beginning and evolution.
2. Once the group-state is well-defined, there must exist a mechanism and controls for ensuring all group members are consistent with the group state, or have a trackable and enforceable means of achieving consistency over time. The latter requirement addresses the reality of independent group members, each of which can have their own schedules for attaining consistency with the group, particularly given that group consistency is a moving target.

The act of altering an administered server's configuration or state for the purpose of moving toward consistency with its group-level configuration, as described in (2) above, is called "synchronization". For a fixed group state, given sufficient time and opportunity for all members to synchronize, all members will achieve group steady state. That is, all servers begin in the same initial state, and will end up in the same final state given sufficient time and opportunity to synchronize with a new group state. The definition of the initial state, and the evolutionary path required to get to the new group state, is captured by requirement (1) above, whereas the mechanism that takes group members along the correct evolutionary path from initial to final states is captured by requirement (2) above.

The invention provides a solution to the above-noted problem by providing a method and apparatus, preferably in software form, for use in an information handling network having an administrative control server and a number of administered servers that are members of the network and are managed by the control server, of providing maintenance of the administered servers for maintaining conformity of configuration of each of the administered servers to a predetermined configuration for all administered servers of the network while permitting evolution of the predetermined configuration from an initial network member configuration to a current network member configuration to which each of the administered servers is to conform, the method including: evolving, as required, the configuration of each administered server from its current configuration state to the current network member configuration in the following steps: initiating communication, by an administered server, of identification information to the control server identifying the administered server; verifying by the control server whether the administered server is a member of the network managed by the control server, and if it is so managed, then; determining by the control server whether the administered server configuration requires evolution to the current network member configuration; and, if evolution is required by the administered server, then the control server determines what commands are required to evolve the administered server configuration to the current network member configuration; the control server communicates the required commands to the administered server; the administered server executes the required commands to evolve its configuration to the current network member configuration; and the administered server communicates results of the execution of the commands to the control server identifying whether its configuration was successfully evolved to the current network member configuration.

Another aspect of the invention provides a computer program product including storage means and instructions stored thereon for use in an information handling network including an administrative control server and a plurality of administered servers that are members of the network and are managed by the control server, a method of providing for maintenance of the administered servers for maintaining conformity of configuration of each of the administered servers to a predetermined configuration for all administered servers of the network while permitting evolution of the predetermined configuration from an initial network member configuration to a current network member configuration to which each of the administered servers is to conform, the instructions including program routines for evolving, as required, the configuration of each administered server from its current configuration state to the current network member configuration in the following steps:

initiating communication, by an administered server, of identification information to the control server identifying the administered server; verifying by the control server whether the administered server is a member of the network managed by the control server, and if it is so managed, then, determining by the control server whether the administered server configuration requires evolution to the current network member configuration, and; if evolution is required by the administered server, then the control server determines what commands are required to evolve the administered server configuration to the current network member configuration; the control server communicates the required commands to the administered server; the administered server executes the required commands to evolve its configuration to the current network member configuration; and the administered server communicates results of the execution of the commands to the control server identifying whether its configuration was successfully evolved to the current network member configuration.

BRIEF DESCRIPTION OF THE DRAWINGS

The invention will now be described with specific reference to the appended figures wherein:

FIG. 2 illustrates the synchronization of administered servers from a control server in accordance with this invention;

DETAILED DESCRIPTION OF A PREFERRED EMBODIMENT OF THE INVENTION

Figure 3:
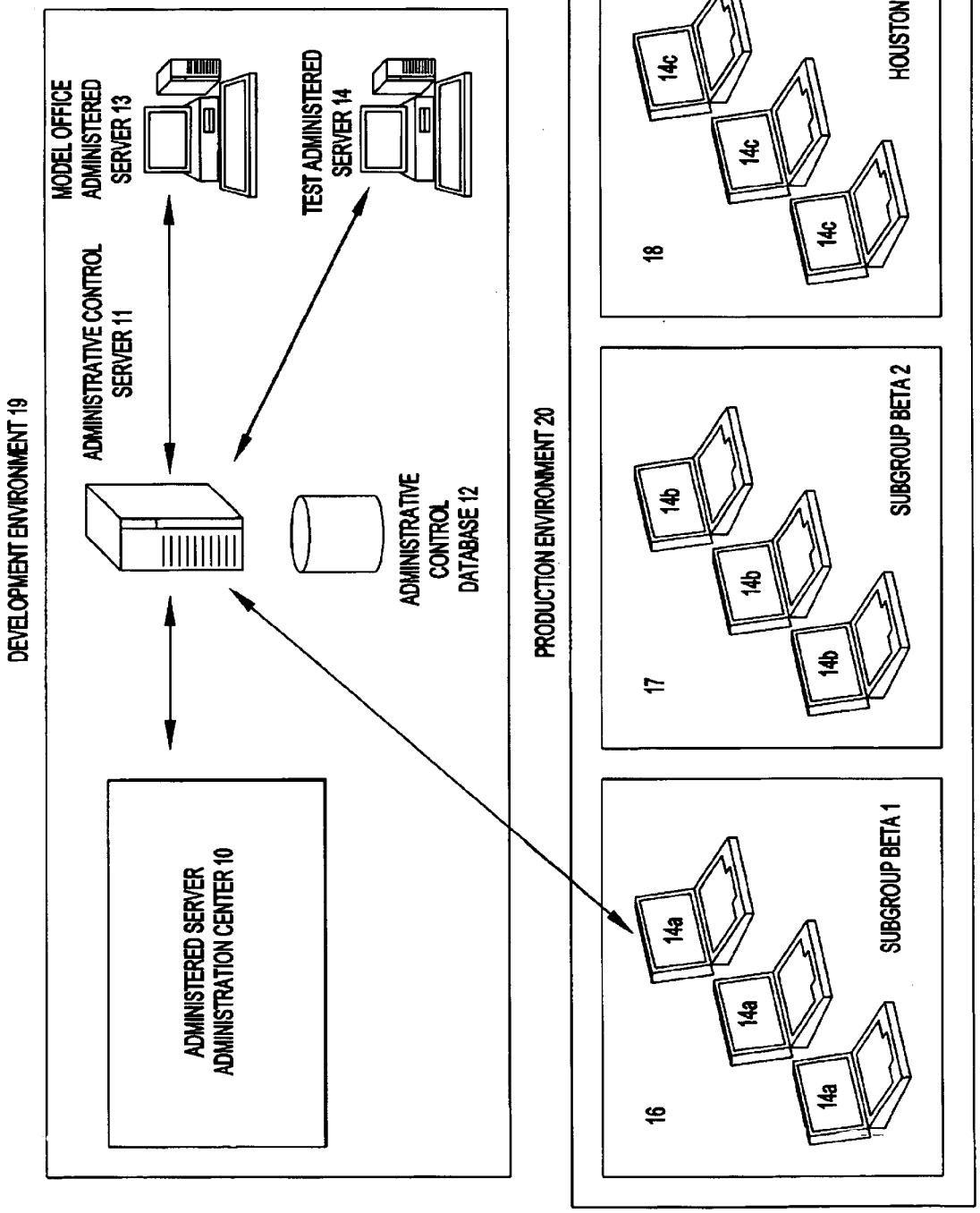
FIG. 3 illustrates the application of the invention from a development to production environment.
Figure 4:
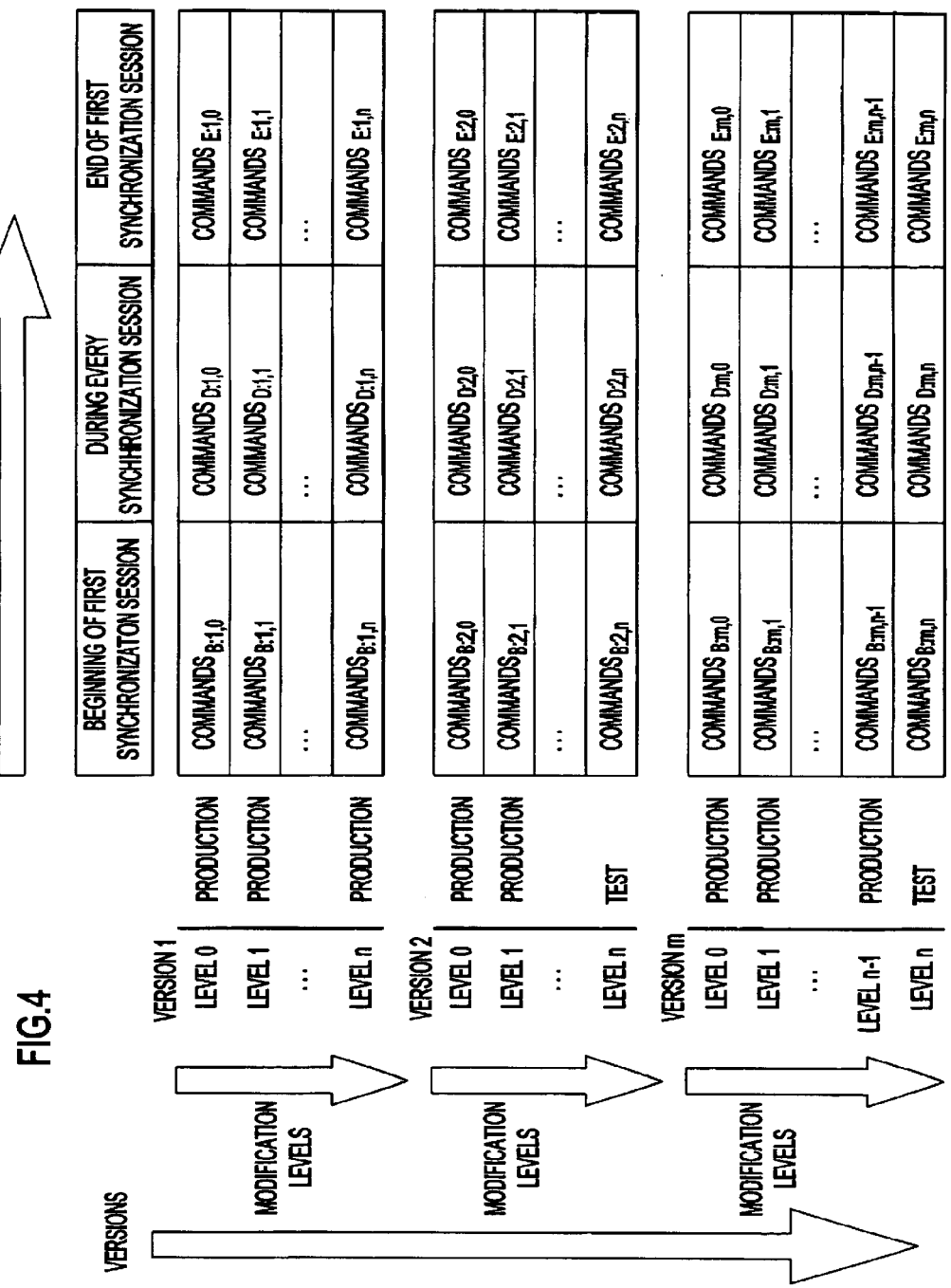
FIG. 4 illustrates a life cycle model-maintenance timeline.
Figure 5B:
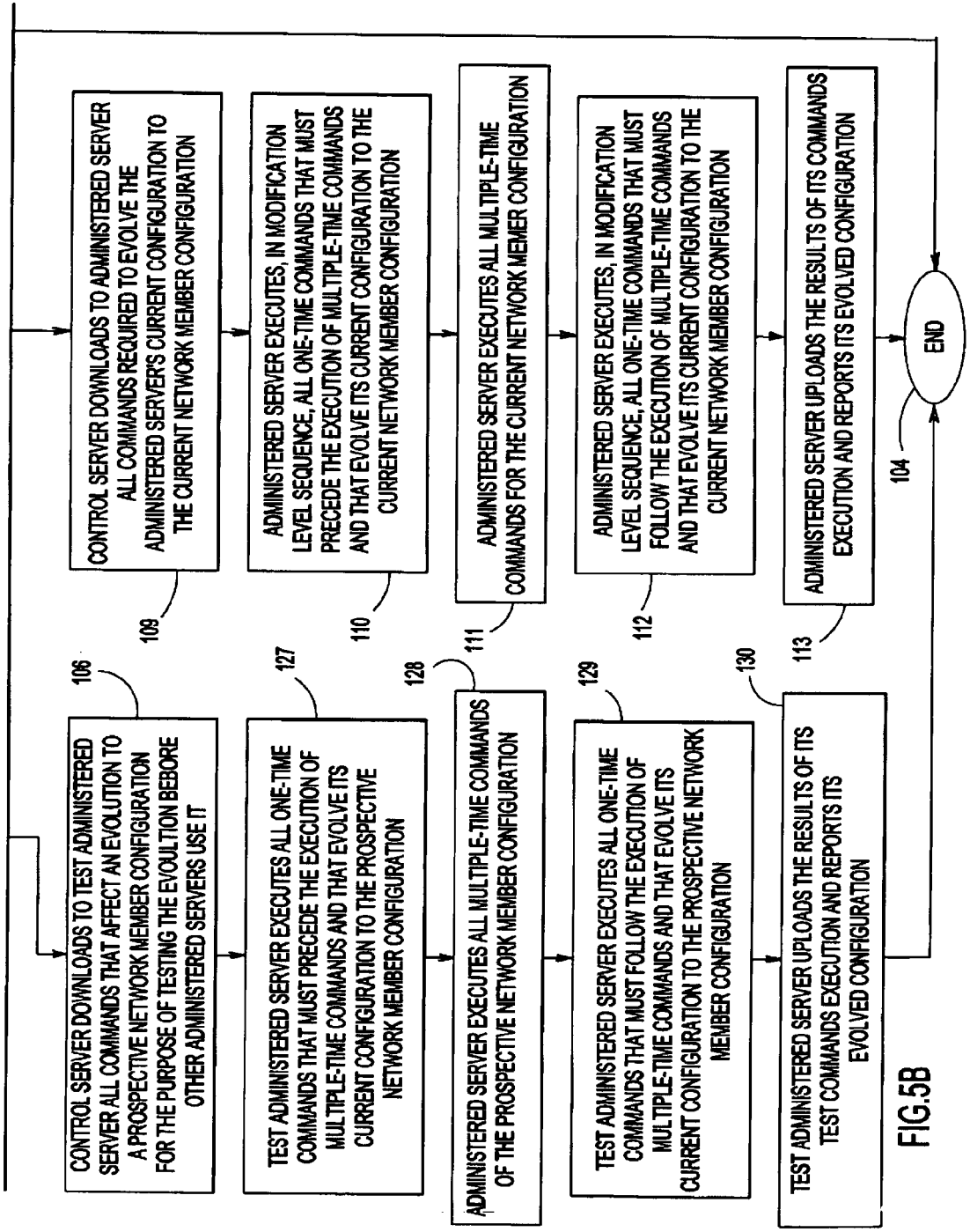
FIG. 5 illustrates a flow chart of an embodiment of the invention.

The administered server environment such as depicted in FIGS. 3, 4 and 5 is an environment in which large numbers of servers can be administered from a central control site. Although the servers being administered (administered servers) need not be limited to database servers. The invention herein can be applied to the database environment and so for the purposes of this description we will discuss the invention in the context of database servers.

In the administered server environment, collections of database servers are set up. Each collection is known as a "group". Each database server that belongs to a group is called an "administered server". Groups are used to organize administered servers that have shared characteristics into single entities. The characteristics that many administered servers could share are the end-user application that runs on them, and the database definition that supports the application.

For the purpose of this description, database definition is the setup of the database system, including, but not limited to, the instance, the database manager configuration parameter values, the database design, and the database configuration parameter values.

In a group, the administered servers are similar in terms of their database definition, usage, and purpose. For example, assume that there are two groups in an organization, Sales and Support. The Sales group would require one end-user application and database definition, while the Support group would require a different end-user application and database definition.

By grouping the administered servers together, an administrator can administer small numbers of groups, which may contain hundreds, if not thousands of administered servers, rather than having to administer each of the administered servers individually. If additional database servers that perform the same function as the administered servers of an existing group are acquired, they can be added to that group. The administration solution provided by the administered server environment is fully scalable.

In the administered server environment, the setup and maintenance of any database definition is accomplished by sets of scripts known as "batches". Because the database definition can be different for each group, each group has its own set of batches. The batches that are specific to a group are known as "group batches".

Within a group, administered servers may run different versions of the end-user application, and each version of the end-user application may require its own database definition and data. Group batches are preferably associated with a particular "application version". The application version represents the database definition and data that support a particular version of the end-user application.

Each server that belongs to a group (see FIG. 3, groups 16, 17 and 18) is known as an administered server. An administered server, because it belongs to a group, will have the same end-user application as the other administered servers in the group. Depending on its version of the end-user application, however, it may share its database definition and data with only a subset of the administered servers that belong to its group.

Information about the administered server environment is stored in a central database known as the "administrative control database". This database records, among other things, which administered servers are in the environment, the group each administered server belongs to, and which version of the end-user application an administered server is running. It also records the group batches that the administered servers execute. This database is on a database server that is known as the "administrative control server".

To set up and maintain its database definition, each administered server connects to the administrative control database to download the batches that correspond to its version of the end-user application. The administered server executes these batches locally, then reports the results back to the administrative control database. This process of downloading batches, executing them, then reporting the results of the batch execution is known as "synchronization". An administered server synchronizes to maintain its consistency with the other administered servers that belong to its group and that run the same version of the end-user application.

Figure 1:
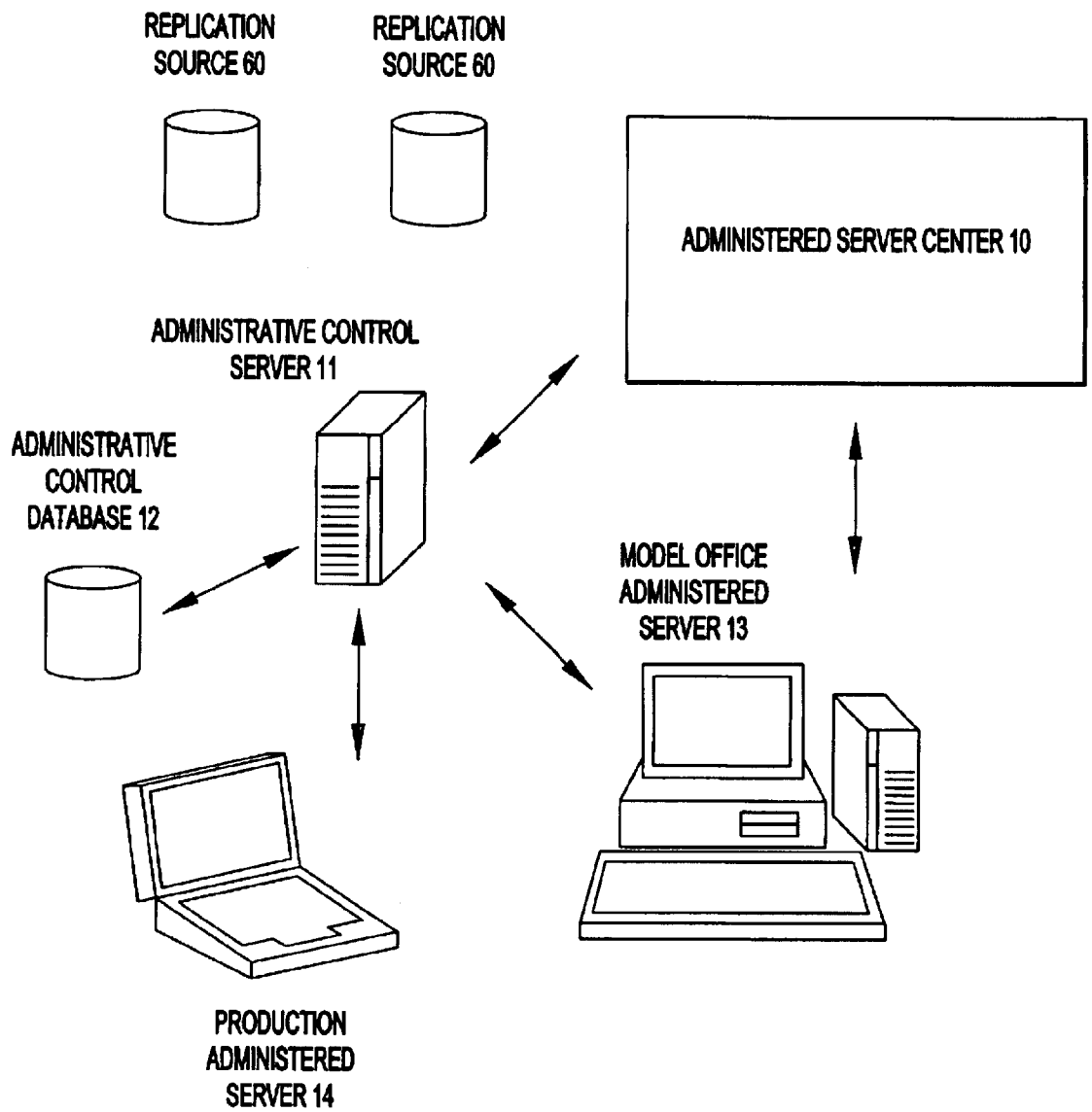
FIG. 1 illustrates a model office including a control server and administered servers.

Referring to FIG. 1, in the administered server environment, administration can be hidden from end users as usually they do not need to learn about database administration. Instead, the administered server environment can be administered centrally from the Administered Server Center (10).

The administrative control server (11) contains the administrative control database (12), which records information about the administered server environment, and manages the synchronization process for administered servers. A database server can be used as a control server.

The information that configures and maintains administered servers is stored in relational tables in the administrative control database (12). Because these tables are in an ordinary database system database, this information is accessible to authorized users, and can be maintained (for example, backed up and restored) using standard database utilities.

Every administered server in the administered server environment must belong to a group. A group is a collection of administered servers that share one or more characteristics. The shared characteristics will be things such as the business function of the administered server users, for example, selling life insurance, and the end-user application that is used to support the business function.

An administered server can only be associated with a single application version. However, within a group, not all administered servers need to be associated with the same application version. This characteristic allows staged deployment of the application. The different versions of the end-user application are supported by the group batches that are associated with different application versions. Note: The term "group", as used in the administered server environment, is not associated with operating system or security groups.

An administered server is any database server that is both a member of a group and synchronizes with an administrative control server to maintain its database definition and data. Along with the DBMS, the administered server will run the business application that end users require. The hardware on which the DBMS and the business application run can be any laptop or desktop computer on which any of the supported operating systems is running. There are two types of administered servers that can be present in the administered server environment: test administered servers and production administered servers. Test administered servers are used to test group batches that set up and maintain the database definition that supports the end-user application. When the group batches are fully tested, and produce satisfactory results, they can be promoted for use by the production administered servers of the group.

Typically, one would assign test administered servers to a development environment. That is, the test administered servers will not manage any active data that is required for business operations.

Production administered servers are assigned to the users that are supported. Unlike test administered servers, production administered servers are not used for testing purposes. Instead, these administered servers execute the tested group batches that have been put into production, which results in them having a stable database definition to support the end-user application. Because production administered servers have a stable database definition, they manage the active data that is required for business operations.

If a database definition on the production administered servers is no longer adequate to support the user requirements, the database definition on the test administered servers can be modified to address the problem that is being reported. When the results of the modification in the development environment are satisfactory, the modification can be made available to the production administered servers.

Referring to FIG. 1 again, which provides an overview of how the Administered Server Center (10), the administrative control server (11), and the model office administered server (13) can interact, a model office administered server is a special member of the test administered servers in the group. Typically, one has one model office administered server for each version of the end-user application that is deployed in the group. A model office administered server can be used for a variety of purposes:

To model initial deployment of the group.
   When the model office administered server is set up, an install image can be created that is based on the model office administered server.
To test the changes that are required to the database definition and data that supports a version of the end-user application that is already in production. The model office administered server provides a representative database, which one can work with using tools such as the Administered Server Center. The behavior of the scripts can be verified by submitting them to execute against the model office administered server.

This means that the production environment is almost entirely isolated from the changes that are made to the model office administered server. When the database definition changes that the scripts produce on the model office administered server are satisfactory, the scripts are promoted to production. The changes will then be executed by the group's production administered servers.

To provide a representation of a typical administered server in the group.

Because the model office represents a typical administered server, it can be useful for problem determination. If an end-user experiences a problem, use the model office administered server, or a copy of it, to reproduce the problem and determine how to fix it.

To deploy a new version of an end-user application. The model office administered server can be used to verify that the installation of the new version of the application provides the correct results, and that the batches produce the expected database definition and data for the end-user application.

Although the administered servers of a group run the same end-user application, they do not have to run the same version of this application. Each version of the end-user application may require a database definition that is different from the other versions of the same application. To set up and maintain the database definition and the data to support a particular version of the end-user application, group batches are used for the application version. Each application version of a group is associated with its own batches.

Each batch is a collection of one or more batch steps. Batch steps can be created to set up and maintain both the database definition and the data for the application version. The batch step is executed on the administered server when the administered server synchronizes.

A batch step is made of the following components:

A script. As an example, a script can be a database command, an SQL statement, or an operating system command.

An execution target. By way of example, the scripts that are created can execute against a database instance, database, or on the operating system on the administered server. The database instance, database, or operating system against which the script executes is known as an execution target.

Authentication credentials. Before a script can execute against a database or operating system, for example, it must be authenticated. That is, the script requires the combination of a user ID and password so that, for example, the administered server can connect to the database. This combination of user ID and password is known as authentication credentials.

A success code set. The execution of a script is considered to be successful if its return code is within a set of return codes predefined for that script. This set of codes is known as a success code set.

The batch steps within a batch are always executed in the sequence in which they appear in the batch. When one batch step within a batch is executed successfully, the next batch step is executed. If, as defined by the success code set, an error occurs when an administered server is executing a batch step, that administered server stops executing its group batches, and reports an error back to the administrative control server. When the error is fixed, the administered server can continue executing from the batch step that caused the error.

The application version is set at the administered server, typically during the installation and configuration of the end-user application on the administered server. When an administered server synchronizes, it reports its application version to its administrative control server before it downloads and executes the scripts associated with the group batches for the application version.

The administered servers of a particular group need to be in a state consistent with the other administered servers of its group. The consistent state can be accomplished with synchronization.

FIG. 2 provides a high-level view of how an administered server synchronizes. Before the administered server (14) can synchronize, it must connect to the network on which the administrative control server resides. The administered server can connect with the network in a variety of ways, such as by a dial-up program, by docking with the network, or by remaining permanently connected to the network.

The administered server synchronizes as follows:

1. The synchronizer function (15) is invoked by the administered server (14). The invocation can be from a user application or from a database Synchronizer application that is provided with the DBMS. When the synchronizer function (15) is invoked, steps 2 through 8 occur automatically. No manual intervention is required. The administered server (14) is only connected to the administrative control database (12) for step 3 and for step 7.
2. The administered server connects to the administrative control database (12), where it is authenticated.
3. After authentication occurs, the administrative control server checks which group the administered server belongs to, and the version of the application that the administered server is executing. The administrative control server uses this information to determine which batches the administered server should execute, and which batch steps should be executed, if any. At this time, other events may also occur:
   a) If the administered server could not upload the results of its previous synchronization session to the administrative control database, the results are written at this time.
   b) If any of the scripts in a batch to be downloaded are parameterized, the database control server instantiates the script with the values that are appropriate for the administered server.
   c) When steps 3a and 3b are complete (if required), the administrative control server releases the scripts that the administered server is to execute, and the administered server downloads them. When this occurs, the tables in the administrative control database are updated to indicate that the administered server has obtained the batches that apply to it.
4. The synchronizer function drops the connection with the administrative control database.
5. The administered server executes the batches that it downloaded.
6. After executing the batches, the synchronizer function again connects to the administrative control database.
7. The synchronizer function updates the log information in the administrative control database with the results of the execution of the different steps of the batches. The log information provides details about the execution of the batch steps.
8. The synchronizer function drops the connection with the administrative control database.

After the synchronization session is complete, the administered server can be disconnected from the network, if required.

Within a group, administered servers run the same end-user application, have a common interest in the same data, have similar database definitions, and perhaps the same execution environment. Typically, within a group, the administered servers are used by people with the same occupation, such as selling life insurance.

The group can contain administered servers that run a different version of the end-user application. Because the database definition and data that support each version of the application are set up and maintained by the batches of a specific application version, different versions of the end-user application can be deployed. This enables one to stage the deployment of a new version of the end-user application within the group.

Because administered servers are organized by group, one administers at the group level, and not at the individual administered server level. This greatly simplifies administration. Instead of having to manage hundreds, if not thousands, of administered servers separately, one manages the group to which they belong. The group batches that maintain the database definition and data for a particular version of an end-user application are associated with the application version. These group batches are organized into application versions for each version of the end-user application running on the administered servers of the group.

When one creates new administered servers for the administered server environment, one adds them to the group that is already running the end-user application that the new administered servers will run. When these administered servers synchronize for the first time, they will download and execute the group batches that apply to the version of the end-user application that they are running. No special tasks have to be performed to integrate these administered servers into the environment. This means that the administration model that is used to set up and maintain the administered server environment is fully scalable. The groups that are set up can contain as many administered servers as the business requires.

The Administered Server Administration Center (10) is used to set up and maintain administered servers, groups, and the batches that the administered servers execute when they synchronize.

FIG. 3 shows a sample setup of the administered server environment. In the example, the development environment (19), which includes the Administered Server Administration Center (10), the administrative control server and administrative control database (12), as well as the model office administered server (13) and test administered servers (14t), is almost entirely separate from the production environment (20). The development environment can be used both to create and test the batches that the production administered servers will execute.

In FIG. 3, all the production administered servers (14a, 14b, 14c) in the production environment (20) belong to the same group, but belong to different subgroups (16, 17, 18). Subgroups can be used to stage the deployment of the first version of the end-user application.

When rolling out the first version of the end-user application, the deployment is staged to control which administered servers can synchronize (that is, which administered servers can execute the group batches). The deployment is also staged to test whether the database definition and data is appropriate for the end-user application in the production environment. While the group batches may produce correct results on the model office and test administered servers of the development environment, the active data of the production environment may indicate that the group batches have to be modified. For example, in FIG. 3, the subgroup (16) Beta 1 is the first stage of the deployment, that is, only the Beta 1 subgroup can synchronize with the administrative control server. Assume that reports are received from the Beta 1 users that the performance of the end-user application is not satisfactory. The application-performance problem can be addressed, then, when the problem is resolved for the Beta 1 subgroup, continue by rolling out the Beta 2 subgroup (17). Because the Beta 1 and Beta 2 subgroups are running the same version of the end-user application, they execute the same group batches of the same application version. This means that the Beta 2 subgroup is not likely to report the same problem as the Beta 1 subgroup. To stage the deployment of the first version of the application by subgroups, the administered servers are enabled, subgroup by subgroup, to execute the group batches.

Subgroups can also be used to stage the deployment of the next version of the end-user application. For example, assume that the Beta 2 and Houston (18) subgroups are running the first version of the end-user application, and that the second version of the application has been tested on a model office or test administered server, then installed the new version of the application on the Beta 1 subgroup. In this situation, all the subgroups will be enabled to synchronize, and all will be maintaining active data. The difference is that when the Beta 1 subgroup synchronizes, it executes the group batches associated with the second application version, while Beta 2 and Houston execute the group batches of the first application version. In this situation, the Beta 1 subgroup can be used both to determine whether the new version of the end-user application is appropriate for your business requirements in the production environment, and whether the group batches that the Beta 1 subgroup executes produce satisfactory results.

Batches are used to ensure that the administered servers in a group remain as similar as possible. All the group administered servers execute the same group batches that set up and maintain the database definition and data for their version of the end-user application. They also execute the batch steps of these batches in the same order. Because the group administered servers execute the same group batches and batch steps, each administered server in the group will be similar.

Batches can also be used to fix administered servers that either report problems, or require an adjustment. The function of a batch depends on its mode. A batch is an ordered set of batch steps. A batch step is the combination of a script, the target against which the script is to execute, the authentication credentials required for the script to execute against a database or operating system, for example, and a success code set to indicate whether the script completed successfully or not. The script can be, for example, a DBMS command, SQL statement, or an operating system command to be run by an administered server.

There are three different modes of batches in the administered server environment:

Group To set up and maintain the database definition and data on administered servers, group batches are used. A group batch is associated with a particular application version. In addition, each administered server is associated with an application version. When an administered server synchronizes, it downloads and executes the group batches for its particular application version. The administered servers always execute the batch steps of the group batches in the same order. Before the group administered servers execute the batch steps, they are all similar. When all the administered servers have executed all the batch steps of all their group batches, they remain similar.

Because the administered servers execute the group batches to maintain their database definition and data, one only has to work with the batches, instead of individually maintaining the hundreds, if not thousands of group administered servers.

A group batch will be either a setup, update, or cleanup batch.

Fix In any environment, problems may occasionally occur. A fix batch is one that is created to fix a problem on one or more administered servers. This is in contrast to the purpose of group batches, which is to set up and maintain the database definition and data for a specific version of the end-user application. Because of this difference of purpose, fix batches are not assigned to a specific group or to an application version.

Unassigned An unassigned batch is one that maintains its mode until it is assigned to either:

An application version, to be executed by a group as a setup, update, or cleanup batch An administered server, that will execute the batch as a fix batch.

An unassigned batch can be modified in any fashion, and deleted. If an unassigned batch is assigned to an application version, the batch becomes a group batch. If the batch is assigned as a fix batch, which is used to make changes to a specific administered server, the unassigned batch becomes a fix batch. In both cases, the change in how the batch is used permanently changes the mode of the batch. That is, the batch cannot be changed back to an unassigned batch.

Group batches are associated with an application version, and are used to set up and maintain the database definition and data on the administered servers that are running a particular version of an end-user application.

Even though the administered servers in the group may execute the batch steps at different times, each administered server of the group will execute the same set of batch steps, and will execute them in the same order. This ensures the consistency of the administered servers that belong to the group. It also simplifies the management of large numbers of administered servers. One is aware that the administered servers are similar because they have all executed the same set of steps in the same order. If the administered servers started out similar before executing the batches of an application version, they will remain similar after they have all executed the batches.

Three types of group batches can be executed by administered servers when they synchronize: setup, update, and cleanup. Typically, the setup batch will be used to set up, for example, the database definition for the administered server, the update batch to maintain the data on the administered server, and the cleanup batch to perform cleanup activities on the administered server. Using group batches allows consistency to be maintained among the administered servers of a group without having to maintain each administered server separately. Only one of each type of group batch can be associated with an application version.

When the administered server synchronizes for the first time, it executes, in order, the batch steps of the setup batch to configure itself, the batch steps of the update batch to, for example, populate its tables, and the batch steps of the cleanup batch to perform any cleanup activities. After an administered server synchronizes for the first time, it will execute any new batch steps that are appended to the setup batch to modify its database definition (if required). The administered server then executes all the batch steps of the update batch to maintain its data. Finally, the administered server will execute any batch steps that are appended to the cleanup batch.

Details about the different types of group batches are as follows:

Setup A setup batch is an ordered set of batch steps that is executed first, before any other batches. Each batch step in a setup batch is run only once by an administered server. If a new batch step is added to the setup batch, and the setup batch has already been executed by a given administered server, only the new batch step will be executed by that administered server. The setup batch can be used to set up, for example, the database definition on the administered server, including schemas, tables, indexes, and any other database objects that are required. The setup batch can also be used to set configuration parameter values and to set up data replication.

Update An update batch is an ordered set of batch steps, and each step is executed every time that the administered server synchronizes. This type of batch is run after a setup batch is run, and before a cleanup batch is run. The batch steps in an update batch are those that can be repeatedly executed. A typical update batch will consist of a data synchronization batch step.

The steps in an update batch are considered to be idempotent, in the sense that they can be repeatedly executed without changing the current state or database definition of the administered server to a different state with each invocation of the step. For example, a table can be replicated multiple times without resulting in a change in the replication configuration. In contrast, the batch step in the setup batch that originally created the table would be executed only once.

Cleanup A cleanup batch is an ordered set of batch steps that is executed last, after the update batch. Each batch step in a cleanup batch is run only once by an administered server. If a new batch step is added to the cleanup batch, and the cleanup batch has already been executed by a given administered server, only the new batch step will be executed by that administered server. A typical cleanup batch is one that contains a batch step that updates the database statistics.

Depending on requirements, it may not be necessary to create all three types of group batches. For example, a different mechanism may be used to set up the database definition than the setup batch. If a specific type of batch does not exist when an administered server synchronizes, that batch type is bypassed.

At some point in time, a new version of the end-user application may need to be deployed. Typically, a new version of an end-user application will require a different database definition than the previous version. Consequently, the batches and the associated scripts used to maintain the new database definition will be different.

If there are a large number of administered servers in a group, one may probably want to stage the deployment of a new version of the end-user application within that group. That is, one will want to keep most administered servers of the group at one version of the end-user application, and use a subset of the group administered servers to determine whether the new version of the application meets business requirements. To stage the deployment, however, it may be necessary to support more than one set of batches for a group of administered servers. There will be one set of batches for each version of the end-user application that is used by the group. That is, one set for the original version, and one set for the new version to be deployed. The administered server environment supports this requirement through the implementation of application versions.

Each collection of setup, update, and cleanup batches that maintains the database definition and data for the end-user application is associated with an application version. For every version of the end-user application that is used in a group, a different application version is required, and its associated batches. Every group, therefore, must have at least one application version.

When an application version is created on the administrative control database, a unique identifier is supplied for the application version. After the application version is created, setup, update and cleanup batches may be associated with it.

An administered server will run a particular application to fulfill a specific business requirement. The version of the application on the administered server is identified by the application version that is set on the administered server. The application version is usually set on the administered server during the installation of the end-user application. When a value is set on the administered server for the end-user application, the same identifier used on the administrative control database should be used.

When an administered server synchronizes, it uploads its application version to the administrative control server. The administrative control server uses this information, in conjunction with the group that the administered server belongs to, to determine which of the group batches the administered server will execute. The administrative control server only allows the administered server to download and execute the group batches that correspond to the administered server's application version.

Assume that there is a large group of users who will all sell life insurance using the first version of the end-user application. Because the group is large, it may not be practical to perform the deployment at one time. Because of this, the deployment is staged.

To stage the deployment, administered servers that have a shared characteristic are enabled, such as a common subgroup, to begin executing the group batches. As more and more administered servers are deployed scaling the environment larger and larger, it may be that the database definition and data that seemed appropriate for the application in the earlier stages of the deployment is no longer adequate. For example, reports may be received that performance of the end-user application is becoming worse for many users. It may be that the amount of data that is maintained by each administered server is larger than originally anticipated. This situation may not necessarily result in administered servers returning errors and requiring fix batches, but it may be necessary to make some changes to the database definition. In this situation, adding indexes to one or more tables will improve the performance of the end-user application. Rather than creating a new application version, which is appropriate only if the version of the application that end users run will be changed, a new level of the existing application version would be created. This new level of the application version can then be modified to change the database definition.

A new level of an application version is a copy of the setup, update and cleanup batches of the previous level of the application version. One or more additional batch steps can be added that are designed to modify the database definition or data. Each level of an application version is associated with a particular number. For example, the first level is level 0, the second level is level 1, and so on. In addition, a level can be a test level for execution by test administered servers, a production level for execution for production administered servers, or an obsolete level that is not executed by any administered server.

In the new copy of the setup and cleanup batches, only new batch steps can be appended. The contents or the order of any existing batch steps cannot be modified. The next time the administered servers synchronize, they will only execute the new batch steps of these two batches. All the administered servers will execute the new batch steps in the same order, ensuring that the administered servers remain consistent after they all execute the new batch steps. If there are new administered servers that have never synchronized, they will execute all the batch steps, including the new ones. Because all the administered servers in a group that have the same application version run the same setup and cleanup batch steps in the same order, they will have a similar database definition and data after they execute all the batch steps.

The new level of the update batch, however, can be modified in any way required. Unlike the situation that applies to setup and cleanup batches, an administered server executes all the batch steps of the update batch each time that it synchronizes. By definition, the update batch is idempotent. That is, an administered server can execute the update batch repeatedly without changing its current state or database definition.

The way that an application interfaces with its data does not change within a version of an application. Once the underlying database definition is set up to support the end-user application, it is unlikely that it will be necessary to substantially modify it. Rather, the database definition will be extended in small ways to address intermittent problems such as performance. For this reason, the setup and cleanup batches can only be appended to. Although the database definition sets the structure of the data, with a fixed number of tables and columns, the data content is subject to continual updates. One of the primary uses of the update batch is to replicate data between the administered server and one or more replication sources. The replication operation can be changed in any way to ensure that administered servers have the data that they require. For this reason, the update batch in a new level is fully modifiable.

In the situation described above, in which the performance of the application is impacted because of an increase in the amount of data managed by each administered server, a new batch step would be added to the setup batch to create indexes. All administered servers in the group that have the same application version will execute the new batch step to create the index when they next synchronize. Differences exist, however, in the number of setup batch steps that the administered server will execute when it next synchronizes, depending on when the administered server was rolled out:

If an administered server was part of an earlier stage of the deployment, and has already executed all of the original group batches, this administered server will first execute the new batch step in the setup batch to create the indexes, then continue by executing the update batch. The new index will result in improved performance for the end-user application.

If an administered server is new and has not yet synchronized, the first time it synchronizes, the administered server will execute all the batch steps in the setup batch, including the new batch step that creates the indexes. When this administered server completes the synchronization process (that is, it executes all batch steps to the end of the cleanup batch), it will be consistent with older members of the group. This administered server will not report the performance impact on the end-user application.

The levels of an application version allow maintenance and management of the changes to the database definition and data within an application version. Because the Administrative Control Database maintains a history of the different levels of the application version, changes that have occurred over the life time of the application version can be tracked.

Levels simplify the administration of groups because they allow testing of database definition changes on test administered servers, without affecting production administered servers. Levels also allow the hundreds (or thousands) of production administered servers that belong to a group to be maintained. Each level in a application version has one of the following states: test, production, or obsolete. When the first level for an application version is created, that level, and the batches associated with it, are in the test state. These test batches set up and maintain the database definition and data for the test administered servers. These test batches can be modified until the results are satisfactory in that they produce on the test administered servers. Then, the test level is promoted to production.

When the level is promoted to production, the batches associated with this level can be executed by the production administered servers. All the administered servers of the group need not be enabled at the same time to begin executing the production batches at the same time. For example, subsets of the group administered servers may be progressively enabled to execute the production batches. Subsets of the administered servers can be deployed according to a characteristic that the subset shares, such as a subgroup. When these administered servers are enabled, they will download and execute the production batches the first time that they synchronize. Over time, all the group administered servers will be enabled to execute the production batches.

When the production administered servers are executing the batches of the production level, it may be necessary to modify the database definition or data generated by the production batches to address a problem. For example, assume that users are calling in, saying that performance of the end-user application is becoming worse over time. It is determined that adding indexes to a table will improve the performance of the application. To fix the problem, a new test level is created from the existing production level. Than a batch step is appended to the setup batch to create the indexes. Because the new level is in the test state, only the test administered servers will be able to execute the new batch step of the test setup batch. When the results that the test batch generates are satisfactory on the test administered servers (that is, the performance of the application is again satisfactory), the test level is promoted to the production level. The next time that they synchronize, the production administered servers will download the new batch step and create the indexes.

The levels, and the associated states, represent the life cycle of the application version and its associated batches. Additional details about states are as follows:

Test A test level is used to try out changes on the test administered servers of the group. The batches of a test level can only be executed by test administered servers. Whether a new group is being deployed, or changes to the definition are being tested, the batch steps in a test level should be tested to ensure that they produce the desired results. There can only be one level in the test state. With only one test level, one always knows which batches have been modified, and which changes are being tested.

By default, the first level of an application version is created in the test state. This level is level 0. When level 0 is created, all the batches and batch steps that are added to it are in the test state. When level 0 is in the test state, all of its batches and batch steps can be modified. This includes the reordering or deletion of batch steps, and the deletion of the batches.

If a new test level was created from a production level, the setup and cleanup batches can contain a mixture of production and appended test batch steps:

The production steps of the setup and cleanup batches cannot be modified or reordered. Test batch steps can only be appended after the production batch steps to ensure that the changes that occur on the test administered servers result from the test batch steps, and not from changes in the order of the production batch steps.

The steps of the update batch in the test level are at the test state. They can be modified in any way.

When the results of a test level are satisfactory, it can be promoted to production, so that the batches within it can be executed by production administered servers.

Production

The production level is used to set up and maintain the definition and data for the application version that the production administered servers run. Because the batches associated with the production level are fully tested before being promoted, they provide predictable results when the administered servers execute them. Using fully tested batches in a production level allows scaling of your administered server environment to any size required.

To ensure consistency among the administered servers that execute them, production batches cannot be modified or deleted, nor can the batch steps within them. When a test level is promoted to production, all the batches associated with it are set to the production state.

A production level of an application version cannot be directly created. A production level is always a test level that was promoted to production. In this way, test administered servers can be used to test and tune changes to batches. This helps to isolate testing from the production environment. A test level must always be explicitly promoted to production before the production administered servers can execute the new or changed batches.

There can only be one production level of an application version. If there is an existing production level and a test level is promoted to production, the existing production level becomes obsolete. The existing production level is obsoleted because the database definition or the data that it sets up and maintains is no longer adequate to support the end-user application.

If one or more batches of a production level no longer meet all of your requirements, a new test level can be created from it.

Obsolete An obsolete level is no longer adequate to support the end-user application. For this reason, the batches of an obsolete level cannot be executed by any administered server.

There are two ways in which a level can become obsolete:
   A new production level supersedes it. This occurs when a test level is promoted to production, and replaces an existing production level.
   It can be made explicitly obsolete when it is no longer required.
   There can be many obsolete levels. If it is necessary to be able to track the changes to an application version, they should be kept.

The levels of an application version support a test/production/obsolete development model, which can be used in conjunction with the procedure that is used to implement an end-user application.
The following table is an overview of an application version, the available batch types, and the states at which a level can be:

| | Application Version | | |
|---|---|---|---|
| | Levels | | |
| Batches | Test State | Production State | Obsolete State |
| At most, one of the following types of batches can be associated with any level of an application version:<br>• Setup<br>• Update<br>• Cleanup. | The batches of a test level can only be executed by test administered servers.<br><br>When a level is created, the level and the batches that it contains are always in the test state. The batch steps, however, may be a mixture of test and production batch steps. This enables you to validate the changes to the batches before making them available to the production administered servers.<br>An application version can contain only one test level. | The batches of the production level can only be executed by production administered servers.<br><br>The batches and batch steps of a production level cannot be modified in any way. This guarantees consistency among your production administered servers.<br><br>An application version can contain only one production level. | The batches of an obsolete level cannot be executed by any administered server. This occurs because obsolete batches are no longer adequate to support the end-user application.<br><br>multiple obsolete levels of an application version can exist. They can be used to track the changes that have occurred to the configuration and data that support the end-user application |

Referring to FIG. 4 an appreciation of the present invention may be obtained. The discussion that follows describes the method of the invention applied to a test/production/obsolete development model and how this invention applies to the levels of an application version of a program through the life cycle of the application version.

In this model a batch step is a script of commands, heretofore referred to only as commands, and comprise the actions taken to effect a given change to an administered server's configuration. Commands are organized along two dimensions. First, commands are organized according to their role in the creation and maintenance of the group state. At level 0, there are commands that set up the initial state or configuration of a group member. If the initial state requires modification, the requisite commands effecting that modification will appear at level 1. At level 2 can be found commands which modify the state produced by level 1 commands, and so on. So, the modification levels contain commands that define the initial state, and the evolution of that state over time. If it is no longer feasible to evolve the group state—e.g., the group state needs to change so fundamentally that it is more efficient to create a new initial state than it is to evolve the current state—then a new version of modification levels is required. In the new version, the initial state is created by commands at level 0. In fact, modification levels are used to organize commands in this new version in the same manner as they were used in the first version. In the diagram above, this first dimension is represented by the grouping of commands by modification level, then by version. This is the horizontal categorization of commands, or the grouping of commands by row where each row is a modification level and a block of contiguous, sequential levels comprise a version.

Some additional controls are necessary to ensure a smooth evolutionary path. That is, administrative discipline is required in the process of introducing a new modification level so that requirements are properly met and desired outcomes are validated. Otherwise, state evolution becomes a path wrought with many missteps, and the inevitable additional steps that must be taken to undo the damage and restore a previously valid state. This problem is particularly acute when considered from the perspective of very large numbers of group members that must apply the modification levels to synchronize their state with the group state. Once a modification level is applied by one group member, it cannot be changed or those group members which subsequently apply it will not effect the exact same state change. Consequently, all group members will not evolve their state in lock step or consistently. So, once a modification level is guaranteed to produce the desired state change, then that modification level must be impervious to change. However, there is a period of time during which that modification level must be tested to verify its outcome before allowing it to be applied by group members. To accommodate this requirement, an additional control is required to ensure modification levels are applied by group members when appropriate. Specifically, a modification level has an associated state or mode of operation. The state of a modification level is Test if that level is under development and subject to verification. The verification process may involve the use of one or more specially designated group members, test administered servers, which will try out or test the modification level. Once a modification level is deemed to produce the desired effect, that modification level is moved to a Production state. Once in production, a modification level cannot be altered. In a sense, that modification level is locked down; both the commands and the state of the modification level cannot change. At this point, all other group members, production administered servers, may apply the new modification level as they synchronize with the group state; such group members may be considered to be in production.

The second dimension incorporates the act of synchronization with the definition and evolution of the group state. Specifically, a given synchronization session of an administered server can be broken down into three consecutive phases or stages. This break down reflects the different ways in which, and the order in which, alterations can be made to state or configuration during a synchronization session. The primary distinction between the types of changes can be described as those changes that are one-time, and those changes that occur during every synchronization session. The one-time changes include creating and deleting objects, as well as setting or modifying the definition of an object. For example, creating all the table spaces, tables, and indexes in a database occurs only once, while generating statistics, reorganizing tables, or replicating data can occur during every synchronization session. There is a temporal aspect to the break down as well. That is, there exists the need to arrange the order of the one-time changes with the multiple-time changes within a synchronization session. At the very least, it should be possible to effect some one-time changes prior to multiple-time changes. This requirement satisfies the probable dependency between objects acted upon using one-time changes and the multiple-time changes. For example, one-time changes can include the creation of tables which will be changed every time via replication; the existence of the tables is a prerequisite for the correct functioning of the multiple-time changes. As well, for those one-time changes which cannot precede the multiple-time changes, there needs to exist the ability to specify their execution to follow the multiple-time changes.

When combining the first dimension with the second dimension, it becomes evident that modification levels behave differently for multiple-time changes. Specifically, multiple-time changes can be executed repeatedly without producing additive or incremental changes to configuration; basically, they cannot change the definition of the group-level configuration. As such, modifications to the commands that are executed during every synchronization session are themselves not incremental. Consequently, multiple-time changes can be embodied entirely within the highest modification level of a version. For example, a group member that is in production will execute only the multiple-time commands within the highest modification level within its version, and will not apply any multiple-time changes embodied within prior levels. Conversely, that same group member will sequentially apply the one-time changes of all modification levels, since they are cumulative in nature.

With respect to FIG. 4, a diagram of the model, these three stages or phases of synchronization are depicted as three columns of commands. First, you have "Beginning of first synchronization session", which includes commands that execute only once and only at the beginning of the synchronization session. This category accords with the setup batch of scripts of commands. Second is "During every synchronization session", which are commands that are executed every synchronization session. This category accords with the update batch of scripts of commands. Finally, you have "End of first synchronization session", in which can be found commands that execute only once and only at the end of the synchronization session. This category accords with the cleanup batch of scripts of commands.

For example, assume that there is a single production modification level, 0, in the first version, 1. In this case, there can exist at most the following sets of commands: commands B:1,0, commands D:1,0, commands E:1,0. (The notation used to identify the category of the commands is as follows: W:V,M where W is 'B' for Beginning of synchronization session, or 'D' for During synchronization session, or 'E' for End of synchronization session; V is the version; M is the modification level.) Assume all three are defined. In order to simplify the example to clarify the essentials, assume that a single production administered server synchronizes. The synchronization session will consist of executing commands B:1,0, first, followed by commands D:1,0, then commands E:1,0. Subsequently, another synchronization session is initiated. In this session, only commands D:1,0 is executed. That is, the one-time commands of commands B:1,0 and commands E:1,0 were executed during the first synchronization session, so won't be executed in any subsequent sessions. To broaden the example, assume the existence of other production administered servers. Presently in this example, only one administered server has synchronized its configuration with the group; the single administered server is consistent with the group configuration. However, other administered servers have not had the opportunity to do so. Over time, all administered servers will synchronize their configuration and become consistent with the group. It is important to note that consistency is satisfied through the execution of the one-time changes only. Multiple-time commands are considered idempotent. That is, they can be executed repeatedly without producing additive or incremental changes to configuration; basically, they cannot change the definition of the group-level configuration. For example, One-time commands create or delete objects, or modify the configuration of objects. Once an object is created, you do not create it again. Conversely, multiple-time commands include such actions as recomputing statistics on the stored data, or rearranging data to improve efficiency. Such commands can be executed repeatedly without changing the definition of the group-level configuration. Therefore, the group-level is defined by the one-time commands, so all members of the group are considered to be consistent with the group-level configuration if they have executed all the one-time commands.

To introduce some depth to this example, assume that the group-level configuration requires alteration to satisfy some new requirements. Modification level 1, in test state, is created to contain the commands that will effect the requisite changes to the initial configuration that is defined by modification level 0. It is key to the maintenance of consistency both at the group level and across all members of the group that the changes are isolated in modification level 1 and not made directly to the commands of modification level 0. Modification level 0 as it was defined produces a known state given the initial state, and it will continue to do so as long as it is not altered. Some group members have already synchronized with modification level 0, so it is important that the commands of this modification level do not change over time while all other group members synchronize. Only by keeping the commands of the modification level "frozen" in production will it be possible to state that all members' configurations are consistent with the group-level configuration once they've all synchronized. This is the key to vastly simplifying the administration of large numbers of similarly-configured servers.

Once the new modification level, 1, is defined and has been verified to produce the desired results, it can be moved to production so that it may be applied during synchronization sessions. For those administered servers that already synchronized with modification level 0, they will execute the commands of level 1 during their next synchronization session. For those administered servers that have not synchronized with modification level 0, they will execute the one-time commands of modification level 0 before modification level 1, whereas they will only execute the multiple-time commands of modification 1. In both cases, once all administered servers have synchronized, they will all be consistent with the group-level configuration that is defined by modification levels 0 and 1.

As this example demonstrates, the evolutionary path is very well defined, and it is stable. Modification levels are increasing, and each represents incremental or additive changes based on the previous modification level, so the evolutionary path is well defined. Since modification levels cannot be tampered with, the evolutionary path is also stable. As such, there is a great deal of certainty, and a great reduction in the complexity, of defining and maintaining the consistency of large numbers of similarly-configured servers.

A preferred embodiment of the invention may be implemented using the following pseudocode in accordance with the following Assumptions:

1. the algorithm is executed under the context of a single, synchronizing administered server by its control server
2. the unique identifier of this administered server is as_id
3. the configuration version of this administered server is as_version
4. there is a boolean flag—as_inoperative—that indicates whether this administered server can synchronize (as_inoperative=FALSE), or cannot synchronize (as_inoperative=TRUE)
5. the modification level at which this administered server will begin executing commands during the synchronization session is as_level
6. the highest, or last, modification level for a particular version, version, is max_mod_level(version)
7. the type of administered server is as_type, which can be either TEST or PRODUCTION
8. the sequence of commands that will be downloaded to the administered server is stored in the ordered array as_sync_commands[command$_1$ . . . command$_n$], where command$_1$ must be executed by the administered server before command$_2$, and so on, until the last command, command$_n$.

if (control server verifies that as_id refers to a valid administered server that is managed by it) then
{
  if (control server determines that there exists at least one modification level for as_version) then
  {
    control server sets as_sync_commands[ . . . ] to the empty array of commands
    /* First, control server stores in order from modification level as_level to the highest level all one-time commands that will be executed at the beginning of the synchronization session. */
    for (mod_level=as_level; mod_level<=max_mod_level(as_version); mod_level=mod_level+1) do
    {
      control server stores one-time commands for the current level, mod_level,
      in commands[ . . . ]
    }
  control server stores the multiple-time commands from the highest level, max_mod_level(as_version) in commands[ . . . ]
  /* Lastly, control server stores in order from modification level as_level to the highest level all one-time commands that will be executed at the end of the synchronization session. */
  for (mod_level=as_level; mod_level<=max_mod_level(as_version); mod_level=mod_level+1) do
  {
    store one-time commands for the current level, mod_level,
    in commands[ . . . ]
  }
  control server downloads commands[ . . . ] to the administered server
  administered server executes, in sequence beginning from the start until the
  end, all commands stored in commands[ . . . ]
  administered server uploads the results of command execution to its control server
  control server stores results from administered server
  if (control server finds that administered server successfully executed all commands) then
  {
    control server updates as_level to max_mod_level (original as_level)+1
  }
  else
  {
    control server sets as_level to the highest modification level that the administered server successfully executed
  }
  }
}
else
{
  exit with an appropriate "denial of service" error
}

Referring to FIG. 5 which depicts a flow chart of the preferred mode of the invention a fuller appreciation of the invention may be obtained.

A fuller appreciation of the invention may be obtained by referring to the flowchart depicted in FIG. 7, which depicts an implementation of the invention. At the beginning of the process, stage 101, an administered server initiates synchronization by connecting to its control server and identifying itself with its ID and current configuration. The administrative control server determines if the administered server is administered by it, stage 103, and if it is a test server or production server, stage 105. If it is a test server the processes of steps 106 et seq. are followed. If not, the process of stage 107 is begun, under which the control server determines the differences between the current configuration of the administered server and the current network member configuration which is desired. If evolution of the administered server's configuration is required, as determined by the control server, stage 108, then the processes of stage 109 et seq. are followed.

Returning to steps 106 et seq. for the circumstance in which the administered server is a test server, the control server downloads all commands that effect evolution of the configuration of the administered server to the prospective network member configuration for the purpose of testing the evolution before other administered servers are permitted to use it. In order to perform the evolution, the test administered server executes all one-time commands that must precede the execution of multiple-time commands and that evolve its current configuration to the prospective network member configuration, stage 127. Next, stage 128, the test administered server executes all multiple-time commands of the prospective network member configuration, and then in the following stage, 129, the test administered server executes all one-time commands that must follow the execution of multiple-time commands so that it evolves from its current configuration to the prospective network member configuration. Then in stage 130, the test administered server uploads the results of command execution and reports its evolved configuration.

Referring to stage 109 et seq. for non test administered servers, the control server downloads all commands required to evolve the administered server's current configuration to the current network member configuration. At stage 110 the administered server executes, in modification level sequence, all one-time commands that must precede the execution of multiple-time commands that evolve its current configuration to the current network member configuration. In the next stage, 111, all multiple-time commands are executed, and then in stage 112, the administered server executes, in modification level sequence, all one-time commands that must follow the execution of multiple-time commands that evolve its current configuration to the current network member configuration. Then, in stage 113, the administered server uploads the results of command execution and reports its evolved configuration to the control server.

The example that follows describes the test/production/obsolete development model, and how this model applies to the levels of an application version through the life cycle of the application version.

When the first level of a new application version is created, that new level is identified as level 0 and is created in the test state. In the example that follows, there are two batches: configure, which sets up the database definition, including data replication; and replicate, which maintains the data used by the end-user application:

| Application Version | | | | |
|---|---|---|---|---|
| Level | State | Setup Batch | Update Batch | Cleanup Batch |
| 0 | Test | configure | replicate | |

Test administered servers are used to fully test the batches associated with this level of the application version. When the results on the test administered servers are satisfactory, this level is promoted to production. (If the results are not satisfactory, batches can continue to be modified until they produce the correct results. Alternatively, level 0 could be deleted, created again, and new batches created for level 0). When level 0 is promoted, the production administered servers can execute the batches of this level. Level 0, which was at the test state, then moves to the production state, as follows:

| Application Version | | | | |
|---|---|---|---|---|
| Level | State | Setup Batch | Update Batch | Cleanup Batch |
| 0 | Production | configure | replicate | |

Assume that the system is in full production, and a performance problem is identified. To address this problem, an index is added to one of the replicated tables. It is necessary to test this database definition change on the test administered servers before making it available to the production administered servers. This is stated by creating a test level of the existing production level. This new level is in the test state and is a copy of the existing production level. Then, edit level 1 and append a new batch step to the configure batch create the index:

| Application Version | | | | |
|---|---|---|---|---|
| Level | State | Setup Batch | Update Batch | Cleanup Batch |
| 0 | Production | configure | replicate | |
| 1 | Test | configure (with batch step added to create index) | replicate | |

Again, the test administered servers are used to fully test the changes associated with the new test level, level 1. Because all members of the test administered servers already executed all the batch steps associated with level 0 when it was in the test state, the test administered servers will only execute the new batch step in the configure batch to create the index when they next synchronize. (They will also execute the entire replicate batch.) When the results of the index creation are satisfactory, level 1 is promoted to production. Then the production administered servers can execute the batches of this level. Level 0 is no longer adequate to support the end-user application. Because only database definition can be in use in the production environment, level 0 is obsoleted:

| Application Version | | | | |
|---|---|---|---|---|
| Level | State | Setup Batch | Update Batch | Cleanup Batch |
| 0 | Obsolete | configure | replicate | |
| 1 | Production | configure (with batch step added to create index) | replicate | |

When they next synchronize, the production administered servers that have previously synchronized execute only the create index batch step of the configure batch. Administered servers that are synchronizing for the first time execute all the batch steps of the configure batch, including the create index batch step. To maintain the end-user application data, all administered servers run the replicate batch after they execute the configure batch.

Again, time passes. Although the tables are indexed, assume reports are received that the performance of the end-user application is slowly becoming worse. In order to perform data reorganization on the tables on the administered server to reduce data fragmentation, it is again necessary to create a test level from the production level. A cleanup batch could be added to contain the batch step that reorganizes the data. In this way, the data is reorganized after it is updated by the replicate batch:

| | | Application Version | | |
|---|---|---|---|---|
| Level | State | Setup Batch | Update Batch | Cleanup Batch |
| 0 | Obsolete | configure | replicate | |
| 1 | Production | configure (with batch step added to create index) | replicate | |
| 2 | Test | configure (with batch step added to create index) | replicate | reorganize |

Again, level 2 is tested with the test administered servers. When the results are satisfactory, level 2 is promoted to production. Level 1 is automatically obsoleted:

| | | Application Version | | |
|---|---|---|---|---|
| Level | State | Setup Batch | Update Batch | Cleanup Batch |
| 0 | Obsolete | configure | replicate | |
| 1 | Obsolete | configure (with batch step added to create index) | replicate | |
| 2 | Production | configure (with batch step added to create index | replicate | reorganize |

Assuming no new administered servers join the group, all administered servers bypass executing the configure batch, because they have already executed all of its steps. The administered servers start by executing the replicate batch to maintain the data for the end-user application. When the administered servers complete executing the replicate batch, they run the reorganize batch to reorganize the table data. Each administered server only executes the batch step in the reorganize batch once.

When a new test level is created, the update batch steps that were copied from the production level of the update batch are changed to the test state. In this way, the steps and their order in the batch can be modified as required. Because the update batch is, by definition, idempotent, it should not modify the state or definition of the administered server. For example:

If the update batch is used to back up a database, it may be necessary to change the backup buffer size to obtain better performance.

If an operation is timing out, a parameter can be changed that controls the amount of time that it can take to complete.

In these examples, the changes are implemented by minor changes to existing batch steps in the update batch.

Continuing the example, assume that it is necessary to want to back up one mission-critical table on the production administered servers each time that these administered servers synchronize. Assume that it is necessary to have a snapshot of the data of this table before the data is refreshed. A test level is created from level 2, the current production level. Because it is necessary for the backup image to contain a snapshot of the data before it is refreshed, the backup tablespace batch step would be added before the batch steps that update the data:

| | | Application Version | | |
|---|---|---|---|---|
| Level | State | Setup Batch | Update Batch | Cleanup Batch |
| 0 | Obsolete | configure | replicate | |
| 1 | Obsolete | configure (with batch step added to create index) | replicate | |
| 2 | Production | configure (with batch step added to create index) | replicate | reorganize |
| 3 | Test | configure (with batch step added to create index) | replicate (backup tablespace followed by data replication) | reorganize |

When the results are satisfactory, level 3 would be promoted to production. Level 2 would be automatically rendered obsolete.

When a level is created in an application version, it is created in the test state. By definition, only test administered servers can execute the batches of a test level. After the batches in the test level produce the correct results, it will be necessary for the production administered servers to execute them. To do this, the level must be promoted to production.

If there is already a production level and the test level is promoted, the existing production level will be moved to the obsolete state. This occurs because the previous production level is no longer adequate to support the end-user application. Because the test level is a copy of the batches and batch steps of the previous production level, no batch steps are lost from the previous production level. This means that the first time any new production administered servers synchronize, they will run the same production batch steps in the same order as administered servers that were rolled out earlier. The resulting database definition and data on the new administered servers will resemble that of other members of the group. In this way, consistency is maintained across the group.

As described earlier, it may be necessary to refine or extend a setup, update, or cleanup batch that is associated with a production level. When a test level is added, all the batches and batch steps of the production level are copied to the test level. Existing batch steps in the setup and cleanup batches cannot be modified or reordered. Instead, only test batch steps can be appended to these batches. The update batch can be modified in any way required.

In the case of the setup and cleanup batches, the test administered servers will execute only the appended test batch steps. For the update batch, the test administered servers will execute all the batch steps, regardless of whether the batch is changed.

When a production level is made obsolete, the batches associated with it can no longer be executed by any administered servers. All the batch steps in the batches become obsolete. There are two ways in which a production level can be obsoleted:

By promoting a test level to a production level when there is already an existing production level. The existing production level is no longer adequate to support the end-user application, so it becomes an obsolete level.

By manually making obsolete a production level. A level is made obsolete to prevent the execution of its batches, for example, while working on a new test level. Or, if a new version of the end-user application has been fully deployed, which has a different application version. In this situation, no new levels of the previous application version should be created because it is no longer in production.

Batches are ordered sets of batch steps. Batch steps, when in group batches, can be test, production, or obsolete batch steps, depending on the state of the associated level. Each batch step contains a script, as well as other information, which the administered servers use to set up and maintain the database definition and data for the end-user application that runs on the administered servers.

The type of the batch step controls whether that batch step is executed by test or production administered servers, and whether the batch step is modifiable. The relationships between the state of a level and the state of batch steps are as follows:

When an application version is first created, the first level added to it is level 0. This level is at the test state, and is empty. It has no setup, update, or cleanup batches. As batches are created for level 0, their steps are in the test state. This occurs because it will be necessary to rigorously test the batches and batch steps with the test administered servers to ensure that they set up and maintain the database definition and data correctly.

Because all the batch steps are in the test state, they can be modified or reordered until they produce the database definition and data that is required. If required, a batch can be deleted and replaced with a different batch. This characteristic of being completely modifiable only occurs with batches and batch steps associated with level 0 when it is in the test state.

When a new test level is created from the existing production level, all the batches and batch steps in them are copied to the new test level. Within the new test level, the steps that were copied with the setup and cleanup batches are marked as production batch steps, and cannot be modified or reordered. It is possible, however, to append additional test batch steps to these batches.

The copied production batch steps in the test level of the setup and cleanup batches cannot be modified, meaning that the changes to the database definition and data on the test administered servers can only result from the new batch steps. The original batch steps are locked so that, if unexpected problems occur during the test phase, it will be much easier to identify and repair the problems that can occur. Changes cannot result from changes to the original batch steps, or from an interaction between changes in the original batch steps and the new batch steps.

The test batch steps can be modified until they provide the required results on the test administered servers. Steps can even be removed. Because the test of the batch is isolated from the production administered servers, normal production is not affected.

The batch steps that were copied from the update batch of the production level are marked as test batch steps in the new level of the update batch. These batch steps can be modified in any way required.

A test level can be promoted to production. When the level is promoted to production, the batch steps of all batches are changed to the production state. Because the batch steps are in production, they are locked and cannot be modified. The batches and batch steps cannot be modified.

Ordinarily, only production administered servers can execute production batch steps, and only test administered servers can execute test batch steps. An exception occurs if a new test administered server is introduced to the group. In this situation, the new test administered server has not yet executed any batches. When this administered server first synchronizes, it will execute all the batch steps in the batches of a test level including, both production and test steps. In addition, a test administered server can be configured to execute all the batch steps of a test batch including any production batch steps in it.

Obsolete batch steps only exist in the batches of an obsolete level. That is, obsolete batch steps cannot exist in either a test or a production level. Obsolete batch steps cannot be executed by any administered server.

In summary, a production level consists of group batches, the steps of which are in the production state, and are only executed by the production administered servers of the group. Given sufficient time, all the administered servers of the group will contact the administrative control server to synchronize, download the batch steps that they have to execute, and execute the associated scripts. Consequently, all the group administered servers begin at a consistent state, and end at a consistent state. If it is subsequently determined that modifications to the database definition or data are required, a new level of the application version can be created. The new level will be in test state. The setup, update and cleanup batches can then be modified as required.

As previously described, when an update batch is copied to a new level, all the batch steps in the new level of the update batch are set to the test state. The new level of the update batch contains no production batch steps. As a result, the batch steps of an update batch can be modified in any way that is required. Batch steps can be changed, reordered, or new ones can be added and existing ones deleted. When a test administered server synchronizes, it runs all the batch steps that are in the test state. By definition, the batch steps of the update batch are idempotent, and administered servers always execute all the batch steps of the update batch when they synchronize.

A test administered server executes the batch steps of a setup or cleanup batch differently than it executes the batch steps of an update batch. When a test level of an application version is created from a production level, all the batch steps in the setup and cleanup batches are copied, but they remain at the production state. These production batch steps cannot be modified in any way, nor can they be reordered or deleted. New test batch steps can only be appended. Because the appended batch steps are in the test state, they can be modified, reordered, or deleted.

The next time the test administered servers synchronize, the administrative control server will recognize that the test administered servers have not executed the new test batch steps. The test administered servers will only download and execute those test batch steps that they have not previously executed. A test administered server will not download and execute any of the production batch steps, unless that test administered server has not already executed the full set of production batch steps. This situation can occur with a new test administered server.

Typically, the changes that the test batch steps implement should be verified on a small number of test administered servers before promoting the associated test level to production. If changes are required, the test batch steps can be modified or reordered, or new test steps could be added while existing steps could be deleted. The test process is iterative, allowing refinement of the test batch steps until desired results are achieved on the test administered servers. This process occurs without any impact to the production administered servers.

When the test steps achieve the desired results, the test level is promoted to production. The next time a production administered server synchronizes, it will download and execute the new batch steps in the setup and cleanup batches, and all of the batch steps in the update batch, whether they are changed or not. At this point, one cycle of the test-production cycle of batch step development has been completed.

The embodiments of the invention in which an exclusive property or privilege is claimed are defined in the claims as follows:

1. In an information handling network comprising an administrative control server and a plurality of administered servers that are members of said network and are managed by said control server, a method of providing for maintenance of said administered servers for maintaining conformity of configuration of each of said administered servers to a predetermined configuration for all administered servers of said network while permitting evolution of said predetermined configuration from an initial network member configuration to a current network member configuration to which each of said administered servers is to conform, said method comprising:

evolving the configuration of each server from its current configuration state to the current network member configuration in the following steps:

initiating communication, by an administered server, of identification information to said control server identifying said administered server;

verifying, by said control server, whether said administered server is a member of said network managed by said control server;

if it is verified that said administered server is managed by the control server, determining, by said control server, whether said administered server configuration requires evolution to said current network member configuration, and;

if evolution is required by said administered server, then said control server determining what commands are required to evolve said administered server configuration to the said current network member configuration;

said control server communicating said required commands to said administered server, said administered server executing said required commands to evolve its configuration to said current network member configuration; and said administered server communicating results of the execution of said commands to said control server identifying whether its configuration was successfully evolved to said current network member configuration.

2. The method of claim 1 wherein said communication, by an administered server, of identification information to said control server identifies said administered server including its current configuration.

3. In the method of claim 1 wherein said administrative control server includes associated storage for maintaining information identifying:

(a) the current configuration of each of said administered servers;

(b) a plurality of commands sufficient to evolve the configuration of each of said administered servers to the current network member configuration;

(c) information communicated from administered servers identifying whether their configurations were successfully evolved;

said method including the following steps:

said control server, upon determining that an administered server requires evolution, retrieving said required commands from said storage and communicating said required commands to said administered server;

said administered server executing said required commands to evolve its configuration to said current network member configuration;

said administered server communicating to said control server its evolved configuration;

said control server storing in its storage information identifying the evolved configuration of said administered server.

4. The method of claim 3 wherein said administered server communicates to said control server its evolved configuration and information indicating whether said evolution was successfully updated to said current network member configuration; and said control server stores said evolved configuration of said administered server and whether said evolution was successfully updated to said current network member configuration.

5. The method of claim 3 wherein a network member configuration is identified by version and level numbering in which a level is a subset of a version;

wherein differences in levels within a version represent minor evolutionary changes, and wherein differences in versions represent major evolutionary changes in configuration;

wherein said commands comprise commands adapted for one-time execution, and commands adapted for multiple execution;

wherein said one-time commands include commands that may be executed at the beginning of execution by an administered server for the purpose of evolving and also commands that may executed at the end of execution by an administered server for the purpose of evolving; and wherein said commands adapted for multiple execution may be executed between said one-time commands.

6. The method of claim 5 wherein said commands adapted for one-time execution are adapted to insert or remove components including data or software objects or for making single modifications to such data or software objects;

and wherein said multiple time execution commands are adapted for multiple use including modifying or refreshing data.

7. The method of claim 5 wherein said administered server executes said commands for evolving its configuration from its current level to the current network member configuration level as follows:

executing all one-time commands adapted for use at the beginning of command execution for each evolution from each level to the next until the current network member configuration level is achieved;

executing all multiple time commands for the current network member configuration level; and, subsequently executing all one-time commands adapted for use at the end of command execution for each evolution from each level to the next until the current network member configuration level is achieved.

8. The method of claim 5 wherein said administered server comprises a test server which is used to apply the method of evolution of claim 5 to update to a prospective current network member configuration before other administered servers, wherein, when evolution is successfully achieved to the prospective current network member configuration, the administered server communicates said information to said control server which is adapted to adopt said prospective current network member configuration as the current network member configuration and subsequently permits other administered servers to evolve to said current network member configuration.

9. An information handling network comprising:

an administrative control server comprising at least a communication component for communicating with at least one administered server and for receiving identification information from said administered server; a verification component for verifying whether said administered server is a member of said network managed by said control server; a discrimination component for determining whether said administered server configuration requires evolution to said current network member configuration, and for determining what commands are required to be communicated to said administered server to evolve said administered server configuration to the said current network member configuration; and a plurality of administered servers that are members of said network and are managed by said control server, each of said administered servers comprising at least a communication component for initiating communication with the control server, for communicating identification information to said control server and for receiving communicated commands from said control server; and a processing component for executing said required commands to evolve its configuration to said current network member configuration.

10. A computer program product comprising storage means and instructions stored thereon for execution in an information handling network comprising an administrative control server and a plurality of administered servers that are members of said network and are managed by said control server, for performing a method of providing for maintenance of said administered servers for maintaining conformity of configuration of each of said administered servers to a predetermined configuration for all administered servers of said network while permitting evolution of said predetermined configuration from an initial network member configuration to a current network member configuration to which each of said administered servers is to conform said method comprising the steps of:

evolving the configuration of each server from its current configuration state to the current network member configuration in the following steps:

initiating communication, by an administered server, of identification information to said control server identifying said administered server;

verifying, by said control server, whether said administered server is a member of said network managed by said control server;

if it is verified that said administered server is managed by the control server, determining, by said control server, whether said administered server configuration requires evolution to said current network member configuration, and;

if evolution is required by said administered server, then said control server determining what commands are required to evolve said administered server configuration to the said current network member configuration;

said control server communicating said required commands to said administered server;

said administered server executing said required commands to evolve its configuration to said current network member configuration; and said administered server communicating results of the execution of said commands to said control server identifying whether its configuration was successfully evolved to said current network member configuration.

11. The product of claim 10 wherein said communication, by an administered server, of identification information to said control server identifies said administered server including its current configuration.

12. The program product of claim 10 including program routines for execution by said administrative control server and an administered server, where said administrative control server includes associated storage for maintaining information identifying:

(a) the current configuration of each of said administered servers;

(b) a plurality of commands sufficient to evolve the configuration of each of said administered servers to the current network member configuration;

(c) information communicated from administered servers identifying whether their configurations were successfully evolved;

said program routines including routines for executing the following steps:

in said control server upon determining that an administered server requires evolution, retrieving said required commands from said storage and communicating said required commands to said administered server;

in said administered server executing said required commands to evolve its configuration to said current network member configuration; and in said administered server communicating to said control server its evolved configuration;

said control server storing in its storage information identifying the evolved configuration of said administered server.

13. The product of claim 12 comprising program routines for said administered server to communicate to said control server its evolved configuration and whether said evolution was successfully updated to said current network member configuration; and for said control server to store said evolved configuration of said administered server and whether said evolution was successfully updated to said current network member configuration.

14. The program product of claim 12 wherein a network member configuration is identified by version and level numbering in which a level is a subset of a version;

wherein differences in levels within a version represent minor evolutionary changes, and wherein differences in versions represent major evolutionary changes in configuration;

wherein said commands comprise the following types:

commands adapted for one-time execution, and commands adapted for multiple execution;

wherein said one-time commands include commands that may executed at the beginning of execution by an administered server for the purpose of evolving and also commands that may executed at the end of execution by an administered server for the purpose of evolving; and wherein said commands adapted for multiple execution may executed between said one-time commands.

16. The program product of claim 14 wherein said commands adapted for one-time execution are adapted to insert or remove components including data or software objects or for making single modifications to such data or software objects;

and wherein said multiple time execution commands are adapted for multiple use including modifying or refreshing data.

16. The program product of claim 14 wherein said administered server executes said commands for evolving its configuration from its current level to the current network member configuration level comprising program routines to accomplish the following:

executing all one-time commands adapted for use at the beginning of command execution for each evolution from each level to the next until the current network member configuration level is achieved;

followed by executing all multiple time commands for the current network member configuration level; and, subsequently followed by execution of all one-time commands adapted for use at the end of command execution for each evolution from each level to the next until the current network member configuration level is achieved.

17. The program product of claim 14 wherein said administered server comprises a test server which is used to apply the method of evolution carried by the program product of claim 14 to update to a prospective current network member configuration before other administered servers, said program product comprising program routines for operation by said information handling system so that when evolution is successfully achieved to the prospective current network member configuration the administered server communicates said information to said control server which is adapted to adopt said prospective current network member configuration as the current network member configuration and subsequently permits other administered servers to evolve to said current network member configuration.

* * * * *